(12) United States Patent
Hosoda (10) Patent No.: US 7,296,586 B2
(45) Date of Patent: Nov. 20, 2007

(54) GAS-REGULATING UNIT FOR REGULATING A GAS PRESSURE IN A GAS-TIGHT TANK

(75) Inventor: Hideto Hosoda, Minato-ku (JP)

(73) Assignee: Kaneko Sangyo Co., Ltd., Tokyo (JP)

( * ) Notice: Subject to any disclaimer, the term of this patent is extended or adjusted under 35 U.S.C. 154(b) by 11 days.

(21) Appl. No.: 11/114,063

(22) Filed: Apr. 26, 2005

(65) Prior Publication Data

US 2006/0137743 A1 Jun. 29, 2006

(30) Foreign Application Priority Data

Dec. 24, 2004 (JP) ............................. 2004-374169

(51) Int. Cl.
*B67D 5/54* (2006.01)
(52) U.S. Cl. .................... 137/209; 137/488; 137/493.8
(58) Field of Classification Search ................ 137/206, 137/209, 493.8, 488
See application file for complete search history.

(56) References Cited

U.S. PATENT DOCUMENTS

| 1,664,493 | A | * | 4/1928 | Smith .......................... 137/488 |
| 2,732,857 | A | | 1/1956 | Jurs |
| 3,477,456 | A | * | 11/1969 | Powell ......................... 137/171 |
| 3,754,566 | A | * | 8/1973 | Gemigniani ................. 137/488 |
| 4,295,489 | A | * | 10/1981 | Arends et al. ............... 137/488 |
| 5,048,560 | A | * | 9/1991 | Jannotta et al. ........... 137/493.8 |
| 5,135,360 | A | | 8/1992 | Anderson et al. |
| 5,249,593 | A | * | 10/1993 | Higgins et al. ................ 137/12 |
| 5,333,635 | A | | 8/1994 | Higgins et al. |
| 5,356,045 | A | | 10/1994 | Parks et al. |
| 5,992,449 | A | * | 11/1999 | Sprague ....................... 137/488 |
| 6,173,736 | B1 | * | 1/2001 | Ligh ............................ 137/494 |
| 6,371,156 | B1 | * | 4/2002 | Walton et al. ............... 137/488 |
| 2001/0008146 | A1 | | 7/2001 | Guameri |

FOREIGN PATENT DOCUMENTS

| EP | 0851026 A2 | 7/1998 |
| EP | 0851026 A3 | 11/1999 |
| JP | H4-13513 | 3/1992 |

OTHER PUBLICATIONS

European Search Report for Appn. No. 05008656.0-2422 dated Apr. 28, 2006.
First Office action and English translation thereof from Chinese Patent Office dated Jan. 5, 2007 (8 pg).

* cited by examiner

*Primary Examiner*—Greg Huson
*Assistant Examiner*—Craig Price
(74) *Attorney, Agent, or Firm*—Lau & Associates, LLC (57) ABSTRACT

A gas-regulating unit for regulating an internal gas pressure in a gas-tight liquid-storage tank is mounted on the gas-tight tank in which stored liquid is sealed from outside atmosphere by covering a top surface of the stored liquid with an isolating-gas. The gas-regulating unit includes a main gas-exhausting unit and an isolating-gas regulator. The main gas-exhausting unit includes an exhaust valve for opening and exhausting gases from the gas-tight tank when an internal gas pressure in the gas-tight tank increases to more than a specified level. The isolating-gas regulator supplies the isolating-gas when an isolating-gas pressure decreases to less than a specified level. The main gas-exhausting unit and the isolating-gas regulator are integrally coupled with each other.

6 Claims, 9 Drawing Sheets

PRIOR ART

GAS-REGULATING UNIT FOR REGULATING A GAS PRESSURE IN A GAS-TIGHT TANK

BACKGROUND OF THE INVENTION

1. Field of the Invention

This invention relates to a gas-regulating unit for regulating a gas pressure in a gas-tight liquid-storage tank, in which stored liquid is sealed by covering a top surface of the stored liquid with an isolating-gas, in particular, a gas-regulating unit having a simplified gas piping structure and high serviceability.

2. Description of the Related Art

Conventionally, in a large liquid-storage tank, an internal gas pressure is changed, for example, by a gas space increased or decreased by receiving or releasing stored liquid, or for another example, by the air or vapor increased or decreased by an outside atmosphere condition. For coping with the changing internal gas pressure, a breathing valve system is mounted on the large liquid-storage tank.

On the other hand, when the storage liquid is such as petroleum derivative products or chemical liquids, a gas-tight liquid-storage tank is used for purposes of flame protection and deterioration protection of the storage liquid.

Figure 10:
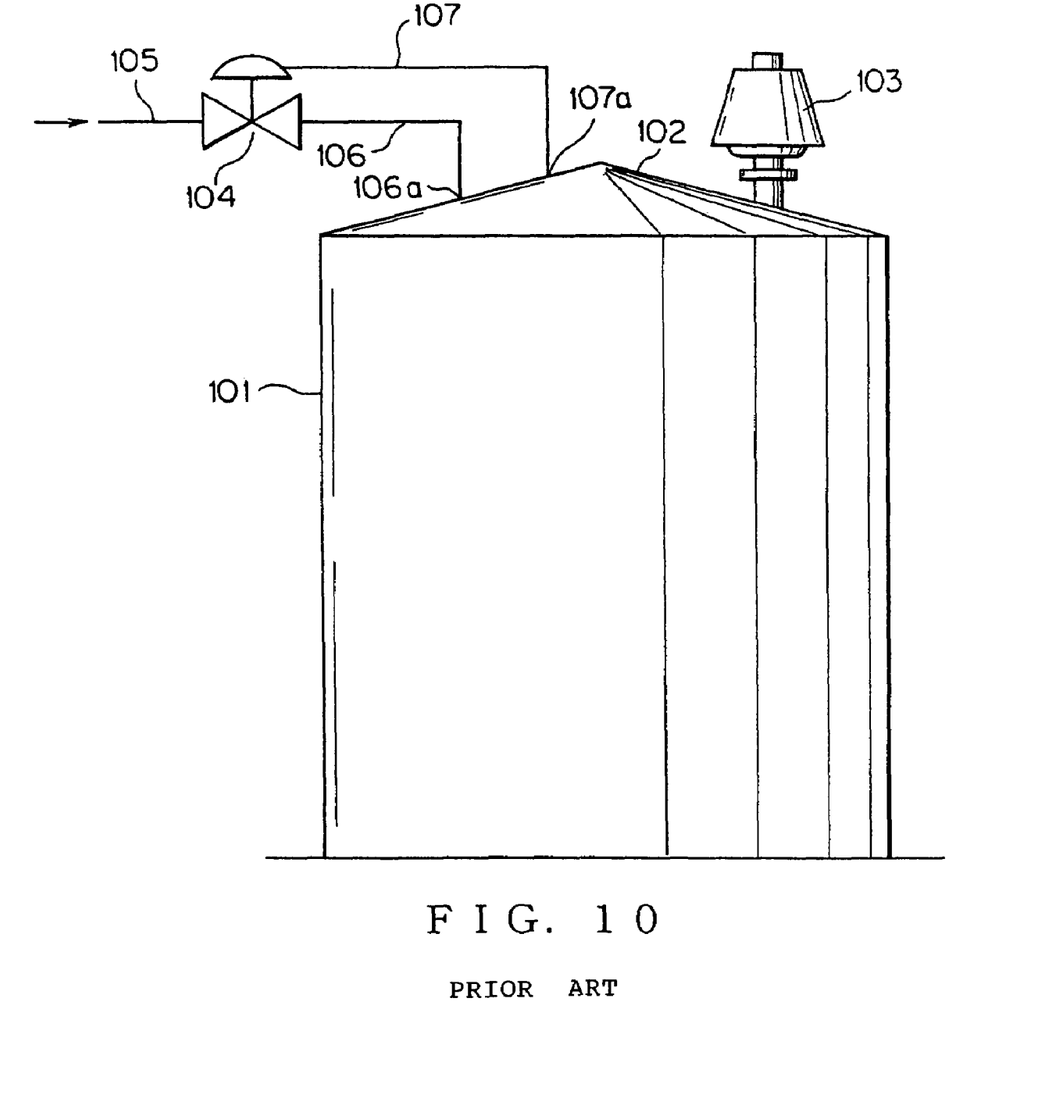
FIG. 10 is a schematic front view showing a conventional configuration of the breathing valve system and the isolating-gas regulator.

As shown in FIG. 10, when mounting both a breathing valve system 103 and an isolating-gas regulator 104 on the liquid-storage tank 101, they are separately mounted on a roof 102 of the liquid-storage tank 101. FIG. 10 shows an upstream pipe 105 of the isolating-gas, a downstream pipe 106 coupling the isolating-gas regulator 104 to the liquid-storage tank 101, and a control pipe (pressure-sensitive pipe) 107 connecting the liquid-storage tank 101 to the isolating-gas regulator 104.

In the gas-tight liquid-storage tank 101, an internal gas pressure should be slightly higher than an outside atmosphere pressure and kept constant. Therefore, it is necessary to control the isolating-gas supply so precisely as to supply the isolating-gas when the internal gas pressure in the liquid-storage tank 101 is less than a specified level. In the past, we suggested a high-precision isolating-gas regulator for the liquid-storage tank described above in a patent document (Utility Model Document No. JP, H04-13513, Y), and excellent results are obtained.

As shown in FIG. 10 of the present application, and FIG. 1 of the patent document, for mounting the breathing valve system 103 and the isolating-gas regulator 104 on the liquid-storage tank 101, fitting holes 107a, 106a of the control pipe 107 and the downstream pipe 106 should be drilled through a roof 102 of the liquid-storage tank 101. Therefore, a piping-work costs a great deal of money, and a large piping space is occupied for mounting the breathing valve system 103 and the isolating-gas regulator 104 on the liquid-storage tank 101.

Further, when mounting on an existing liquid-storage tank, the fitting holes 107a, 106a of the control pipe 107 and the downstream pipe 106 are newly drilled under limitations. Therefore, the existing liquid-storage tank may be heavily modified. Resultingly, there is a problem that mounting the downstream pipe 106 and the control pipe 107 on the existing liquid-storage tank costs a great deal of money.

Accordingly, an object of the present invention is to provide a gas-regulating unit for regulating an internal gas pressure of a gas-tight liquid-storage tank having no disadvantages of the conventional gas-regulating unit described above, and allowing an isolating-gas regulator to be much easily mounted on the liquid-storage tank, to considerably reduce a mounting cost, and to be mounted on an existing liquid-storage tank without a heavy modification work on a roof of the existing liquid-storage tank.

SUMMARY OF THE INVENTION

In order to attain the object, according to the present invention, there is provided a gas-regulating unit for regulating an internal gas pressure in a gas-tight liquid-storage tank, mounted on the gas-tight tank in which stored liquid is sealed from outside atmosphere by covering a top surface of the stored liquid with an isolating-gas including:

a main gas-exhausting unit having an exhaust valve for opening and exhausting gases from the gas-tight tank when an internal gas pressure in the gas-tight tank increases to more than a specified level; and an isolating-gas regulator for supplying the isolating-gas when an isolating-gas pressure decreases to less than a specified level, whereby the main gas-exhausting unit and the isolating-gas regulator are integrally coupled.

Preferably, the main gas-exhausting unit and the isolating-gas regulator are integrally coupled in a manner that a downstream pipe of the isolating-gas regulator is inserted into the main gas-exhausting unit via a fitting port formed on a valve chamber and is fixed.

In the gas-regulating unit for regulating the internal gas pressure in the gas-tight tank, the main gas-exhausting unit is required to include the exhaust valve for opening and exhausting gases from the gas-tight tank when an internal gas pressure in the gas-tight tank increases to more than the specified level, and the isolating-gas regulator supplies the isolating-gas to the gas-tight tank when the internal gas pressure of the gas-tight tank decreases to less than a specified level for control the internal gas pressure to be a specified level.

For coping with a rapid change of the internal gas pressure, preferably, a breathing valve system having the exhaust valve and an intake valve for taking the outside atmosphere in accordance with the decrease of the internal gas pressure in the gas-tight tank is adopted for the main gas-exhausting unit.

In case that the breathing valve system is adopted for the main gas-exhausting unit, when the internal gas pressure in the gas-tight tank increases to more than the specified level, the exhaust valve opens and exhausts gases from the gas-tight tank, and when the internal gas pressure in the gas-tight tank rapidly decreases to less than the specified level, the intake valve supplies the outside atmosphere to the gas-tight tank, while the isolating-gas regulator sensing the decrease of the internal gas pressure through the control pipe (pressure-sensitive pipe) supplies the isolating-gas so as to increase the internal gas pressure to the specified level.

The downstream port of the exhaust valve of the main gas-exhausting unit may be exposed to the outside atmosphere like a conventional breathing valve system, or may be connected to a gas treatment unit for treating an exhaust gas which may be a mixture of a stored liquid vapor and the isolating-gas.

The internal gas pressure in the gas-tight tank is sensed by an end of the control pipe of the isolating-gas regulator being connected to the main gas-exhausting unit in the vicinity of the gas-tight tank. However, the isolating-gas regulator finely regulates an isolating-gas supply. Therefore, preferably, for preventing the isolating-gas regulator from directly receiving the excessive internal gas pressure in the gas-tight tank, an orifice is mounted in between the end of the control pipe of the isolating-gas regulator and the main gas-exhausting unit in the vicinity of the gas-tight tank.

The above and other objects, features, and advantages of the present invention will be better understood when taken in connection with the accompanying drawings and description.

DESCRIPTION OF THE PREFERRED EMBODIMENTS

First Embodiment

Figure 1:
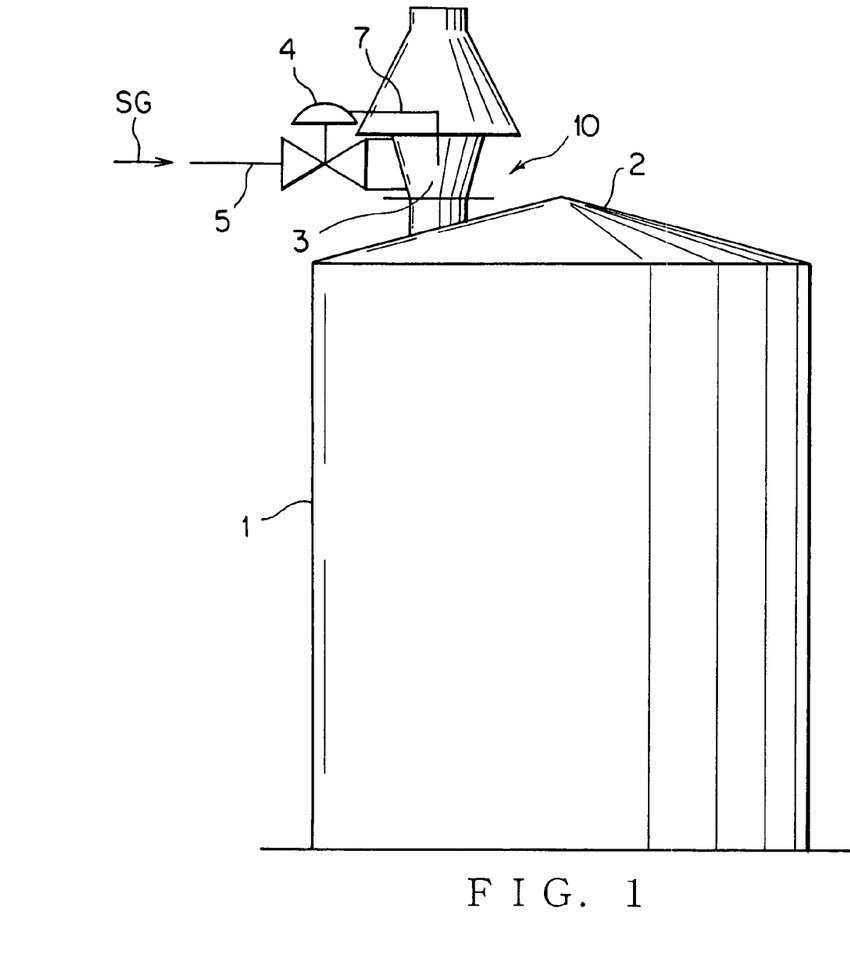
FIG. 1 is a schematic front view showing a liquid-storage tank, on which a breathing valve system connected directly to an isolating-gas regulator is mounted, according to a first embodiment of the present invention.
Figure 2:
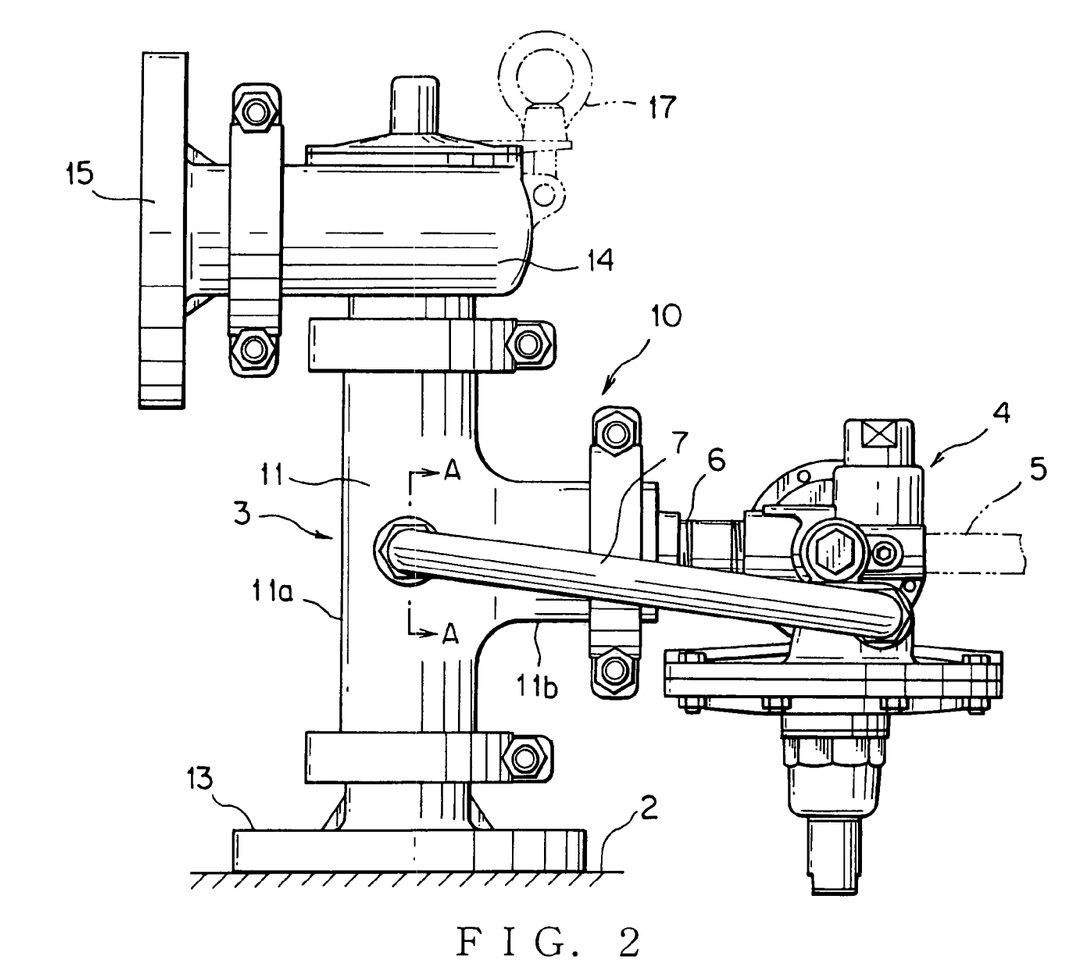
FIG. 2 is a front view showing a gas-regulating unit according to the first embodiment of the present invention.
Figure 3:
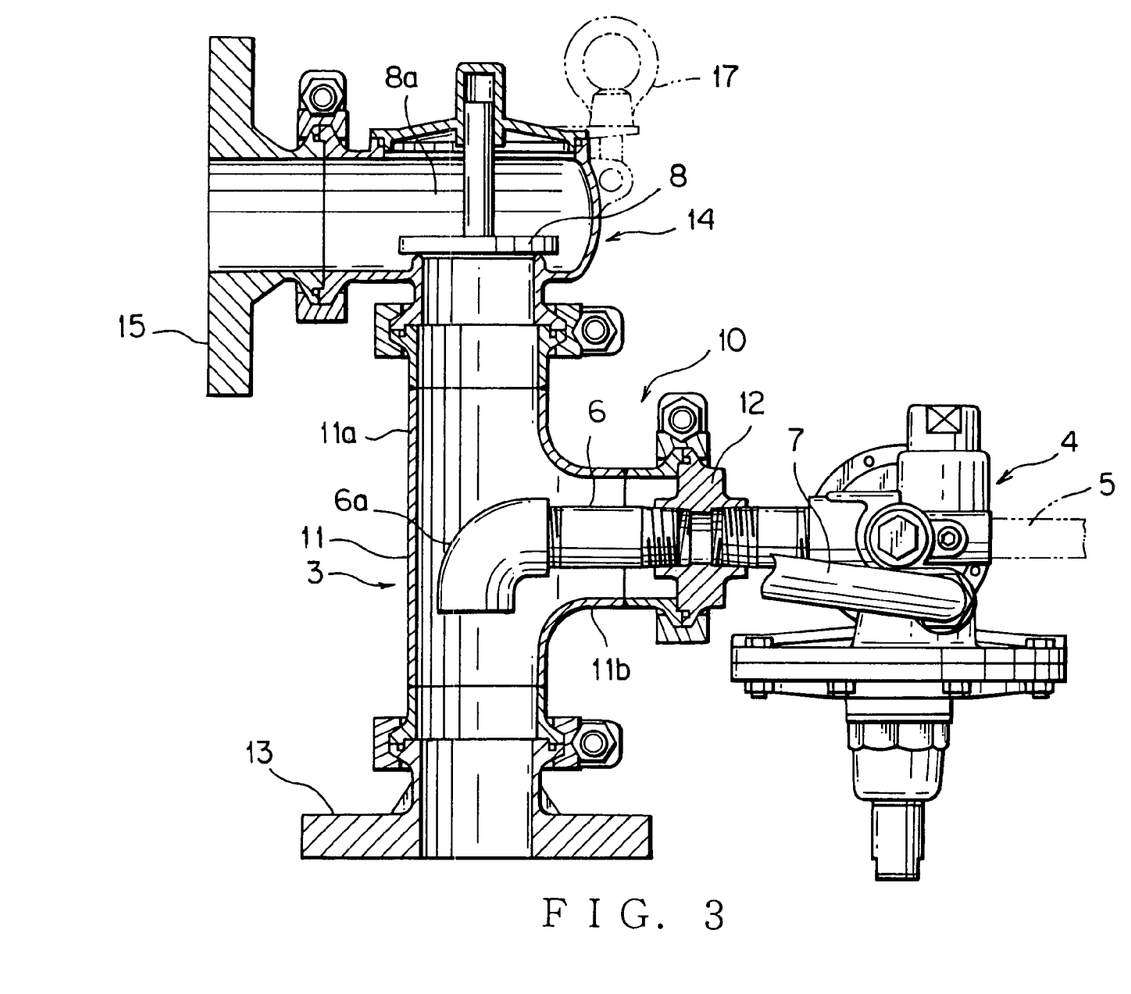
FIG. 3 is a partially sectional front view showing an internal structure of a main gas-exhausting unit according to the first embodiment of the present invention.

A first embodiment of a gas-regulating unit for regulating an internal gas pressure in a gas-tight liquid-storage tank according to the present invention will be explained with reference to FIGS. 1 to 10. As shown in FIG. 1, a liquid-storage tank 1 is a gas-tight tank in which stored liquid is sealed from outside atmosphere by covering a top surface of the stored liquid with an isolating-gas SG. A gas-regulating unit 10 for regulating an internal gas pressure in the liquid-storage tank 1 is mounted on a roof 2 of the liquid storage tank 1. As shown in FIG. 3, the gas-regulating unit 10 includes: a main gas-exhausting unit 3 having an exhaust valve 8 for opening and exhausting gases from the gas-tight tank 1 when the internal gas pressure in the gas-tight tank 1 increases to more than a specified level; and an isolating-gas regulator 4 for supplying the isolating-gas when an isolating-gas pressure decreases to less than a specified level. The main gas-exhausting unit 3 and the isolating-gas regulator 4 are integrally coupled with each other.

Figure 5:
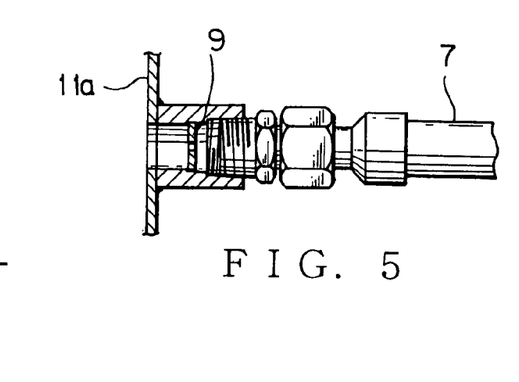
FIG. 5 is a section view taken on line A-A' of FIG. 2 showing an orifice positioned in the vicinity of an end of a control pipe.

FIG. 3 shows an upstream pipe 5 and a downstream pipe 6 of the isolating-gas regulator 4. An end of the downstream pipe 6 is protruded to an interior of the main gas-exhausting unit 8 in the vicinity of the liquid-storage tank via an elbow pipe 6a so that the isolating-gas injected from the end of the downstream pipe 6 is prevented from affecting a sensing of a control pipe 7 explained below. As shown in FIG. 2, an end of the control pipe (pressure-sensitive pipe) 7 of the isolating-gas regulator 4 is connected to a valve chamber 11 of the main gas-exhausting unit 3. Therefore, the internal gas pressure of the gas-tight tank 1 is conducted to the isolating-gas regulator 4 via an orifice 9 as shown in FIG. 5.

In this embodiment as shown in FIG. 3, the valve chamber 11 of the main gas-exhausting unit 3 is formed substantially in a T-shape by a main body 11a and a fitting port 11b. The isolating-gas regulator 4 is attached to the fitting port 11b. The downstream pipe 6 of the isolating-gas regulator 4 is inserted into the interior of the valve chamber 11 via the fitting port 11b, and coupled by a pipe coupler 12.

As shown in FIG. 3, a flange fitting 13 for mounting the main gas-exhausting unit 3 on the roof 2 of the gas-tight tank 1 is formed on a bottom end of the main body 11a of the valve chamber 11. Further, an exhaust port 14 is mounted on a top end of the main body 11a of the valve chamber 11. The exhaust valve 8 of the exhaust port 14 is an overlap type disc valve. A flange fitting 15 for connecting the main gas-exhausting unit 3 to a not-shown gas treatment unit is formed on a downstream part 8a of the exhaust valve 8. Therefore, it is possible that an exhaust gas, which may be a mixture of a stored liquid vapor and the isolating-gas, is treated by the gas treatment unit via the flange fitting 15.

Second Embodiment

Figure 4:
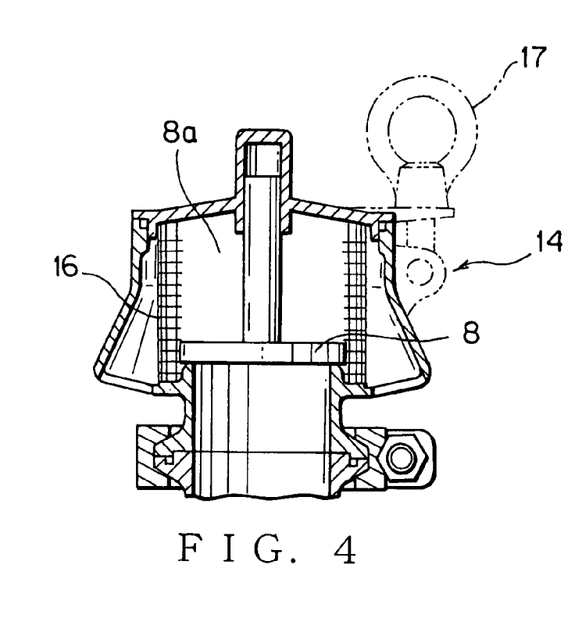
FIG. 4 is a sectional view showing an air-vent valve as an exhaust valve according to a second embodiment of the present invention.

FIG. 4 shows a second embodiment of the gas-regulating unit 10, in which the exhaust port 14 has an air-vent valve. In this embodiment, the exhaust gas is directly released into the outside atmosphere. FIG. 4 shows a cylindrical bird screen 16, a lifting ring 17 for being lifted by such as a crane when the exhaust port 14 is mounted or unmounted.

Third Embodiment

Figure 6:
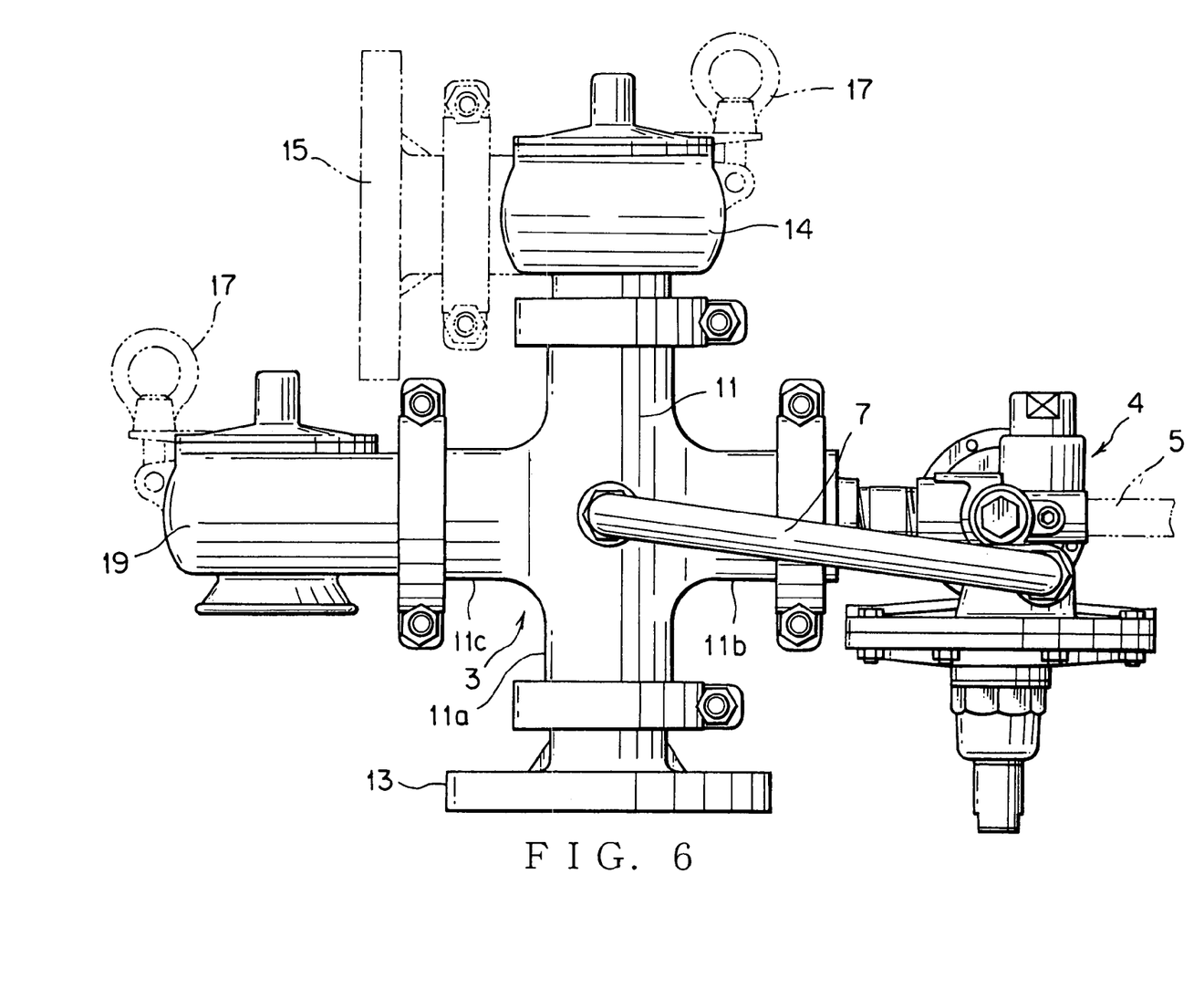
FIG. 6 is a front view showing the breathing valve system adopted for the main gas-exhausting unit according to a third embodiment of the present invention.
Figure 7:
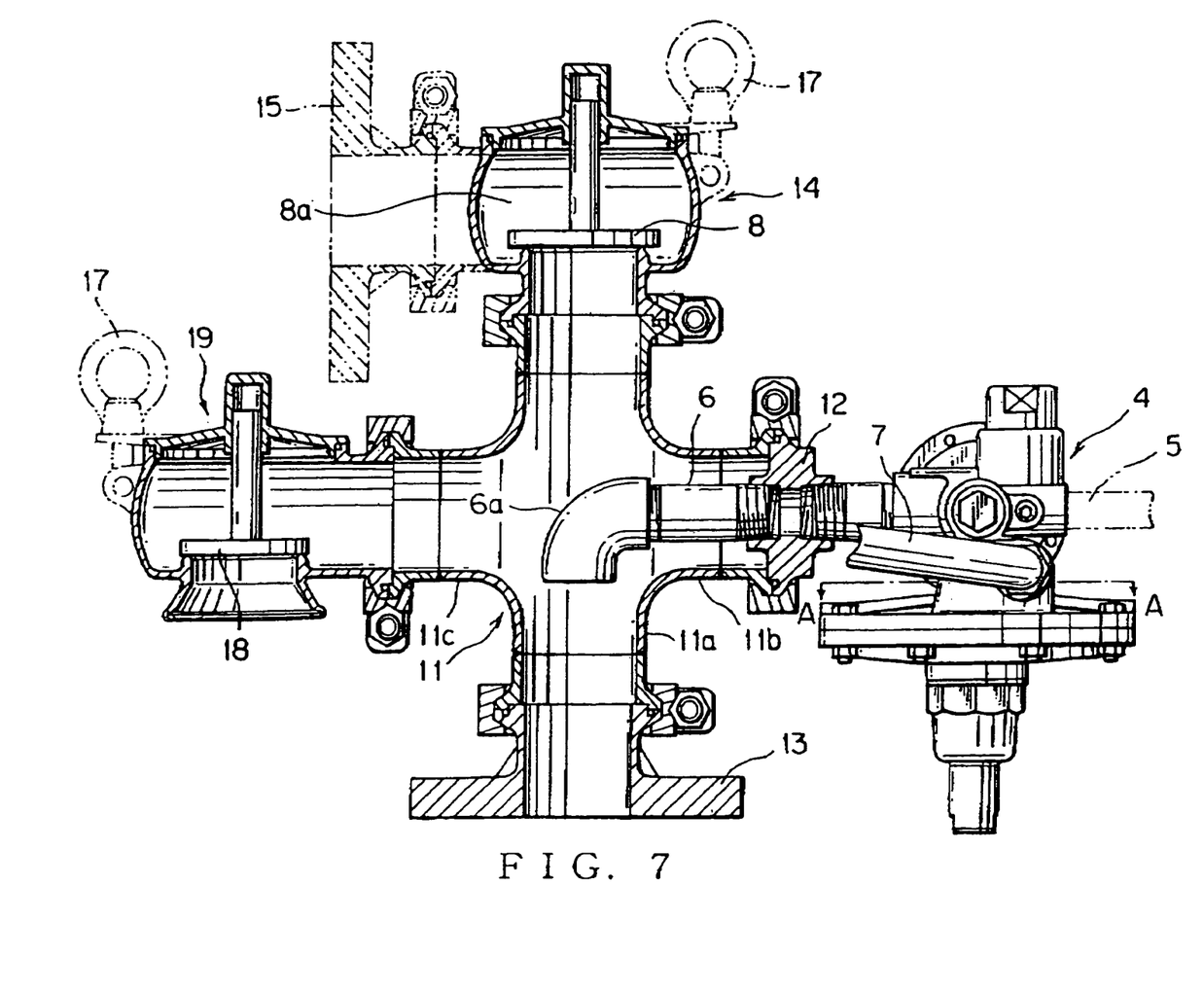
FIG. 7 is a partially sectional front view showing the breathing valve system adopted for the main gas-exhausting unit according to the third embodiment of the present invention.

FIGS. 6 and 7 show a third embodiment of the gas-regulating unit 10, in which a breathing valve system having the exhaust valve 8 described above and an intake valve 18 for taking the outside atmosphere in accordance with a decrease of the internal gas pressure in the gas-tight tank 1 is adopted for a main gas-exhausting unit 3. FIGS. 6 and 7 respectively are a front view and a partially sectional front view showing an internal structure of the main gas-exhausting unit 3 of this embodiment.

According to the third embodiment, in the main gas-exhausting unit 3 having a breathing valve system, the valve chamber 11 is formed in a cross shape by the main body 11a, the fitting port 11b, and an intake port 11c arranged symmetrical to the fitting port 11b. An intake valve chamber 19 is attached to the intake port 11c. In the intake valve chamber 19, an intake valve 18 is lifted to take the outside atmosphere in accordance with a decrease of the internal gas pressure in the gas-tight tank 1. The breathing valve system is mainly adopted for the gas-exhausting unit 3, by introducing the intake valve 18 as described above, to decrease a load on the gas-tight tank 1 as a way of coping with a rapid decrease of the internal gas pressure in the gas-tight tank 1. The intake valve 18 also is a disc valve.

A detailed explanation of the structure of the gas-regulating unit 10 shown in FIGS. 6 and 7 is omitted because this structure is substantially the same as that shown in FIGS. 2 and 3 except the intake valve chamber 19. Additionally, as alternate long and two short dashes lines shown in FIGS. 6 and 7, the flange fitting 16 is rotated a quarter turn from that shown in FIGS. 2 and 3 for avoiding an interference with the intake port 11c.

Figure 8:
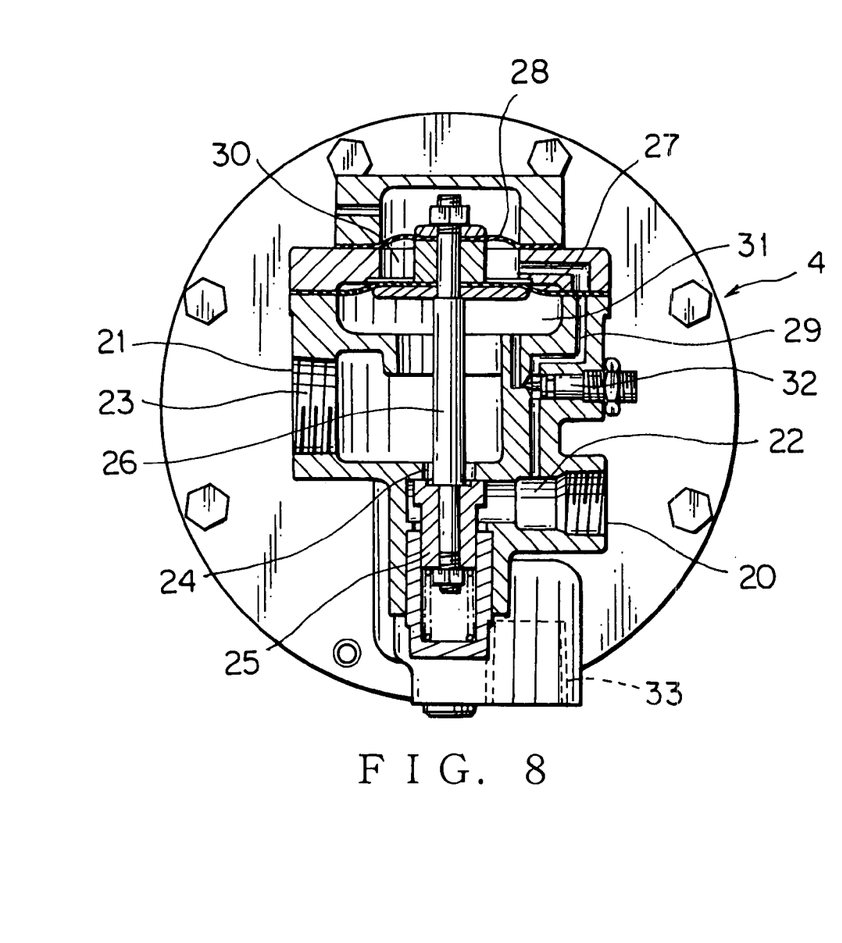
FIG. 8 is a cross-sectional top view showing the isolating-gas regulator according to the present invention.
Figure 9:
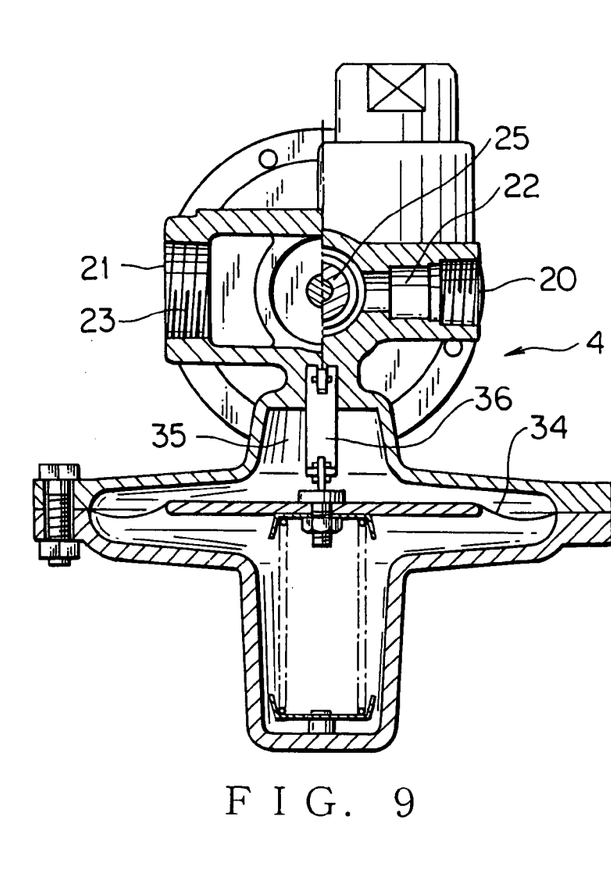
FIG. 9 is a longitudinal-sectional front view showing the isolating-gas regulator according to the present invention.
Figure 9A:
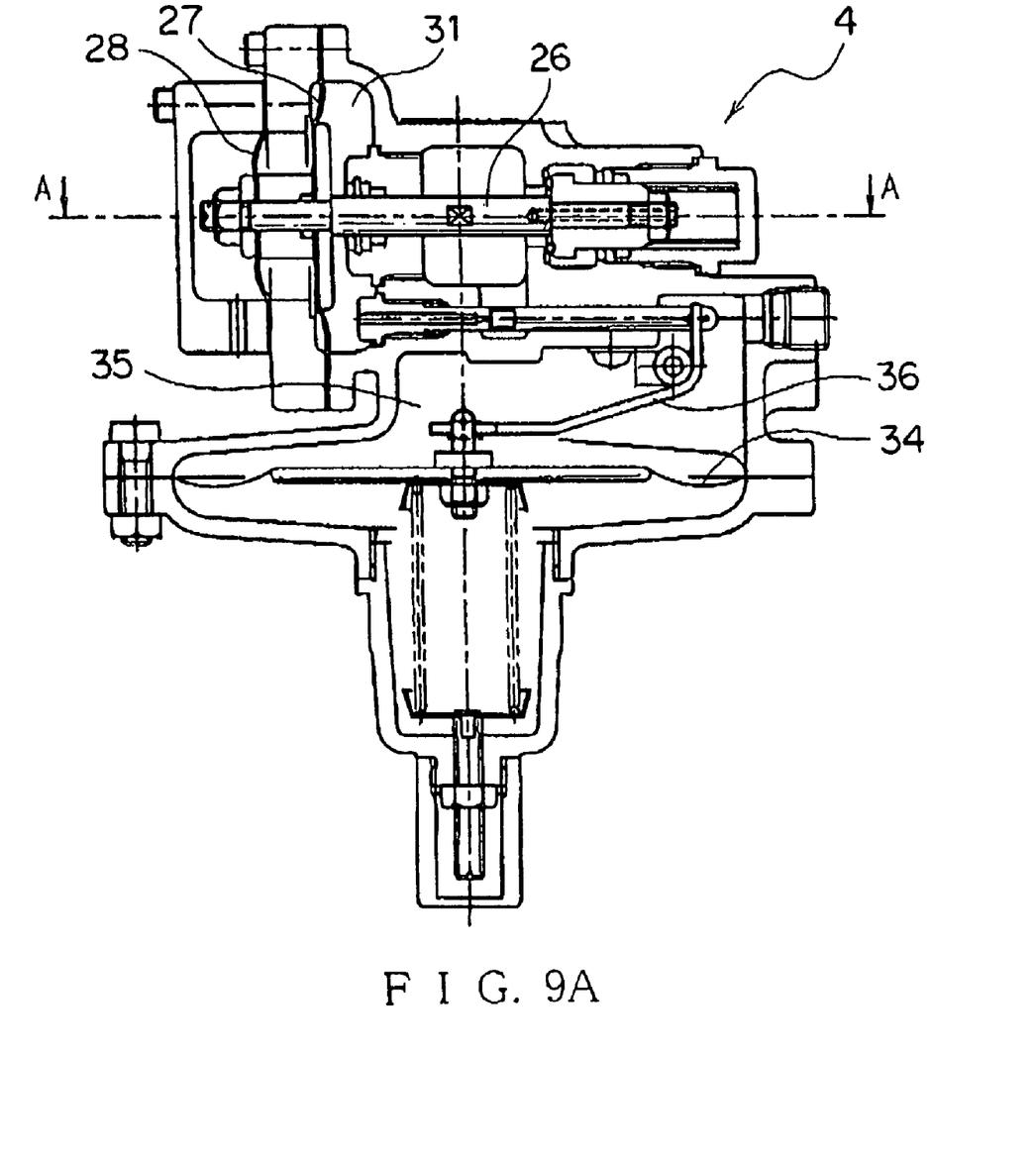
FIG. 9A is a first additional view of what is shown in FIG. 9.
Figure 9B:
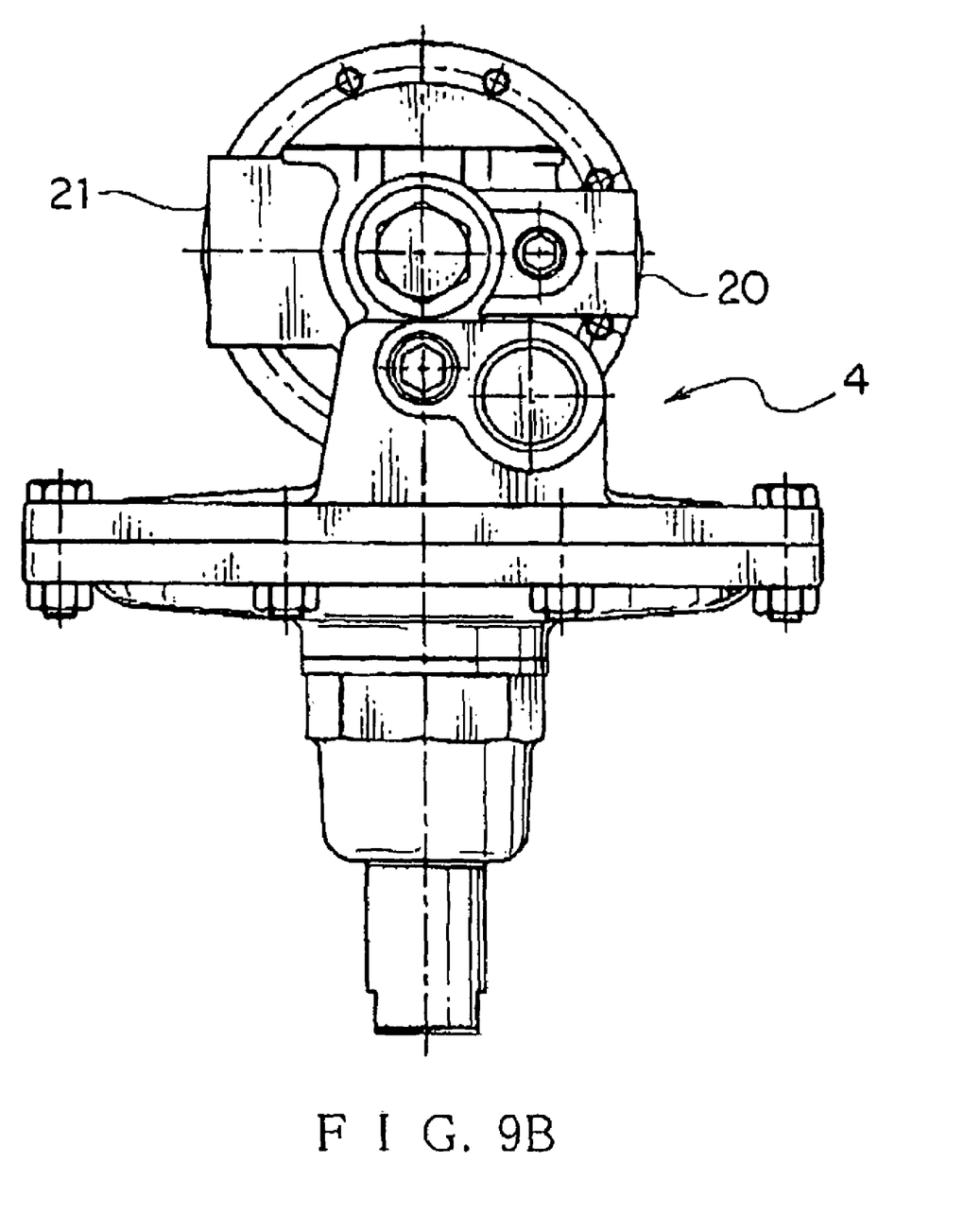
FIG. 9B is a second additional view of what is shown in FIG. 9.

FIG. 8 is a cross sectional top cut away view along line A-A of FIG. 7 showing internal mechanism of the isolating-gas regulator 4, and FIG. 9 is a longitudinal sectional front mid-depth cut-away view of regulator 4 of FIG. 7 wherein the internal mechanism is exposed. A basic structure of the isolating-gas regulator 4 is the same as that disclosed in the patent document by the inventor of the present invention (Utility Model Document No. JP, H04-13513, Y). FIGS. 8, 9, 9A and 9B show a fitting hole 20 for the upstream pipe 5, a fitting hole 21 for the downstream pipe 6, and a fitting hole 33 for connecting the other end of the control pipe (pressure-sensitive pipe) 7.

This isolating-gas regulator 4 includes:
a main valve 25 for opening and closing a communicating path 24 communicating an inlet 22 to an outlet 23 of the isolating-gas;
first and second diaphragms 27 and 28 attached to a valve spindle 26 of the main valve 25;
a first pressure chamber 30 formed in between the first and second diaphragms 27 and 28, and to which the isolating-gas is supplied from the inlet 22 via a bypass 29; a hole having a same diameter as bypass 29 is formed on a communicating part of diaphragm 27; hence, bypass 29 can communicate with the first pressure chamber 30;
a second pressure chamber 31 partitioned by the first diaphragm 27, and to which the isolating-gas is supplied from the inlet 22 via a needle valve 32;
a pilot valve (not shown) being formed in between the second pressure chamber 31 and the outlet 23 for opening and closing a gas flow path (not shown);
a third pressure chamber 35 partitioned by the third diaphragm 34, and to which the isolating-gas is supplied via the control pipe (pressure-sensitive pipe) 7 from the gas-tight tank 1; and
a connecting pipe 36 connecting the third diaphragm 34 to the pilot valve, and opening the pilot valve shutting the gas flow path with the third diaphragm 34 which shifts upward corresponding to a pressure decrease in the third pressure chamber 35.

According to the configuration described above, because the isolating-gas enters the first pressure chamber 30 via the bypass 29 from the inlet 22, and enters the second pressure chamber 31 via the needle valve 32, when the internal gas pressure of the gas-tight tank 1 remains constant, the pressures in the first and second pressure chambers are equal. However, since an outside of the second diaphragm 28 is exposed to the outside atmosphere, a differential pressure caused by an output gas from the second diaphragm 28 acts so as to close the main valve 25. Owing to the control pipe 7, an internal gas pressure in the third pressure chamber 35 is equal to that in the gas-tight tank 1. Thereby, because the internal gas pressure of the gas-tight tank 1 remains constant, the pilot valve closes the gas flow path.

In a condition described above, when the internal gas pressure of the gas-tight tank 1 is decreased, the third diaphragm 34 is pushed up, and the pilot valve opens the gas flow path via the connecting pipe 36. Thereby, the isolating-gas in the second pressure chamber 31 is gradually exhausted to the outlet 23 and enters the gas-tight tank 1 via the downstream pipe 6. The isolating-gas is supplied to the second pressure chamber 31 from the inlet 22. However, since the needle valve 32 regulates an amount supplied to the second pressure chamber 31, the internal gas pressure of the second pressure chamber 31 is gradually decreased. Thereby, the differential pressure between the first and second pressure chambers 30, 31 gradually pushes down the main valve 25 to a lower side of FIG. 8. Then, the communicating path 24 is opened, and the inlet 22 communicates with the outlet 23. Resultingly, a large quantity of the isolating-gas is allowed to be supplied to the gas-tight tank 1.

A large liquid-storage tank is shown in the embodiments described above, however, this invention also is adopted to a small liquid-storage tank.

According to a gas-regulating unit for regulating a gas pressure in a gas-tight liquid-storage tank of the present invention, an isolating-gas covers a stored-liquid surface, and an internal gas pressure in the gas-tight tank is maintained at a specified level. When the internal gas pressure in the gas-tight tank decreases to less than a specified level by releasing the stored-liquid or fall of outside atmosphere temperature, the isolating-gas regulator senses the decrease of the internal gas pressure in the gas-tight tank through the control pipe, and opens a valve to supply the isolating-gas to the gas-tight tank via a downstream pipe. Thereby, the internal gas pressure in the gas-tight tank is maintained at a specified level.

When the internal gas pressure in the gas-tight tank increases to more than a specified level by receiving the stored-liquid or fall of the outside atmosphere temperature, the main gas-exhausting unit opens a valve of the main gas-exhausting unit to exhaust a gas stored in the gas-tight tank. Thereby, the internal gas pressure in the gas-tight tank is maintained at a specified level.

Since the isolating-gas is connected directly to the main gas-exhausting unit, mounting the main gas-exhausting unit on a roof of the gas-tight tank is all that is needed to mount the isolating-gas regulator on the gas-tight tank. Therefore, it is not necessary to drill either a fitting hole for the control pipe, or a fitting hole for the downstream pipe of the isolating-gas regulator on the gas-tight tank.

Therefore, the gas-regulating unit of the present invention allows the isolating-gas regulator to be much easily mounted on the liquid-storage tank, to considerably reduce a mounting cost, and to be mounted on an existing liquid-storage tank without a heavy modification work on a roof of the existing liquid-storage tank. Further, since the isolating-gas regulator and the main gas-exhausting unit are easily disconnected from each other, the gas-regulating unit of the present invention has another effect that only the isolating-gas regulator is detached for maintenance.

Having now fully described the present invention, it will be apparent to one of ordinary skill in the art that many changes and modifications can be made thereto without departing from the scope of the invention as set forth herein.

Incidentally, the contents of Japanese Patent Application No. 2004-374169 are hereby incorporated by reference.

What is claimed is:

1. A gas-regulating unit regulating an internal gas pressure in a gas-tight liquid-storage tank, mounted on the gas-tight tank in which stored liquid is sealed from outside atmosphere by covering a top surface of the stored liquid with an isolating-gas, including:
a main gas-exhausting unit having an exhaust valve for opening and exhausting gases from the gas-tight tank when an internal gas pressure in the gas-tight tank increases to more than a specified level; and an isolating-gas regulator supplying the isolating-gas when an isolating-gas pressure decreases to less than a specified level;

wherein only one opening resides on a roof of the gas-tight liquid-storage tank to minimize the possibility of leakage and the gas regulating unit is mounted thereon the one opening;

wherein the only opening is located away from a center of the roof to reduce a length of an upstream pipe needed to reach the isolating gas regulator; and wherein the main gas-exhausting unit and the isolating-gas regulator are integrally and directly coupled with each other and they only communicate with the gas-tight tank through the only opening residing on the roof of the gas-tight liquid-storage tank.

2. The gas-regulating unit for regulating the internal gas pressure in the gas-tight tank as claimed in claim 1, wherein the main gas-exhausting unit and the isolating-gas regulator are integrally coupled with each other in such a manner that a downstream pipe of the isolating-gas regulator is inserted into the main gas-exhausting unit via a fitting port formed on a valve chamber and fixed thereto.

3. The gas-regulating unit for regulating the internal gas pressure in the gas-tight tank as claimed in claim 1, wherein a breathing valve system having the exhaust valve and an intake valve for taking the outside atmosphere in accordance with a decrease of the internal gas pressure in the gas-tight tank is adopted for the main gas-exhausting unit.

4. The gas-regulating unit for regulating the internal gas pressure in the gas-tight tank as claimed in claim 1, wherein a downstream port of the exhaust valve is exposed to the outside atmosphere.

5. The gas-regulating unit for regulating the internal gas pressure in the gas-tight tank as claimed in claim 1, wherein a connecting part is formed on the downstream port of the main gas-exhausting unit for connecting the main gas-exhausting unit to a gas treatment unit.

6. The gas-regulating unit for regulating the internal gas pressure in the gas-tight tank as claimed in claim 1, wherein an end of a control pipe of the isolating-gas regulator is connected to the main gas-exhausting unit in the vicinity of the gas-tight tank via an orifice of a main body of the valve chamber.

* * * * *